(12) United States Patent
Jörg et al.

(10) Patent No.: US 6,467,365 B1
(45) Date of Patent: Oct. 22, 2002

(54) RACK-AND-PINION ASSEMBLY

(75) Inventors: Wolfgang Jörg, Stuttgart; Wolfgang Oetken, Wendlingen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/629,690

(22) Filed: Aug. 1, 2000

(30) Foreign Application Priority Data

Aug. 3, 1999 (DE) .......................................... 199 36 539

(51) Int. Cl.$^7$ ................................................. B62D 3/12
(52) U.S. Cl. ........................... 74/422; 74/89.17; 74/498
(58) Field of Search ............................. 74/89.17, 422, 74/498; 180/400

(56) References Cited

U.S. PATENT DOCUMENTS

| 2,973,658 | A | * | 3/1961 | Bishop | 91/382 |
|---|---|---|---|---|---|
| 3,628,623 | A | * | 12/1971 | Stockton | 180/428 |
| 3,908,479 | A | * | 9/1975 | MacDuff | 47/498 |
| 3,972,248 | A | * | 8/1976 | Adams | 74/498 |
| 4,368,037 | A | * | 1/1983 | Limque et al. | 432/239 |
| 6,145,252 | A | * | 11/2000 | Fenelon | 49/349 |

FOREIGN PATENT DOCUMENTS

| DE | 33 27 979 C1 | 8/1983 |
|---|---|---|
| DE | 36 27 088 A1 | 8/1986 |

* cited by examiner

Primary Examiner—William C Joyce
(74) Attorney, Agent, or Firm—Kenyon & Kenyon

(57) ABSTRACT

A steering system and more particularly to a rack-and-pinion assembly, in particular for a rack-and-pinion steering assembly for motor vehicles having an input shaft axis arranged at a distance from the rack axis which is greater than the diameter of a pinion meshing with the rack. Preferably, this pinion is arranged between the rack and an input pinion distant from the latter, on an input shaft of the gear.

5 Claims, 3 Drawing Sheets

RACK-AND-PINION ASSEMBLY

FIELD OF INVENTION

The invention relates to a rack-and-pinion gear, in particular for a rack-and-pinion steering of a motor vehicle.

BACKGROUND

In conventional rack-and-pinion steering assemblies, a rack is coupled to vehicle wheels for use in controlling the direction of the wheels, a pinion arranged on an input shaft meshes directly with the rack. The pinion radius is relatively small, the axes of the rack and of the input shaft are therefore at a slight distance from one another, the order of magnitude of which is predetermined by the radius of the pinion.

DE 36 27 088 A1 relates to a rack-and-pinion steering assembly, in which the pinion meshing with the rack is designed as a ring wheel with an external and an internal toothing, the external toothing cooperating with the rack and the internal toothing cooperating with a further pinion arranged on an input shaft. In this case, the input shaft is arranged within a sector of the ring wheel, the said sector being in engagement with the rack via the external toothing. There is therefore only a slight distance between the axes of the rack and input shaft.

DE 33 27 979 C1 relates to a rack-and-pinion steering assembly in which a gear with a variable transmission ratio is arranged between a pinion meshing with the rack and a further pinion arranged on the input shaft, the gear is designed in such a way that the axis of the input shaft is positioned at a comparatively slight distance from the axis of the rack.

Rack-and-pinion steering assemblies may present installation problems, at least with respect to present-day vehicles having an engine arranged in the region of the front axle thus limiting space for the rack and pinion and for other components. As a result, installation of both the rack and steering column can be difficult.

The object of the invention is, therefore, to provide new concepts for rack-and-pinion gears and to improve installation of rack-and-pinion steering assemblies.

SUMMARY

According to one aspect of the invention, the input-shaft axis and rack axis are separated by a distance which is perpendicular to both axes, the dimension of which is greater than the diameter of the pinion meshing with the rack.

According to this aspect of the invention, the invention provides for interposing gear elements between the input shaft and the pinion meshing with the rack such that the distance between the input-shaft axis and rack axis is increased. According to another aspect of the invention, the input-shaft axis is shifted, relative to a conventional position by use of the interposed gear elements, onto the other side of the rack.

According to one aspect of the invention, there is provision for an interposing pinion meshing with the rack on one side and meshing on its circumferential region located diametrically opposite the region of engagement of the rack, with an input pinion which is arranged on the input shaft, so that the order of magnitude of the distance between the rack axis and input-shaft axis is predetermined by the radius of the input pinion and by the diameter of the pinion meshing with the rack.

This type of construction makes it possible to ensure a particularly efficient design, and it is particularly advantageous that freedom from play can be ensured in the most efficient way, in that the rack is pressed resiliently against the pinion meshing with it and this pinion is mounted so as to be moveable in the pressing direction, so that the pressing forces are transmitted to the radially fixably mounted input pinion of the input shaft. The engagements of the rack and pinion and of the pinion and input pinion are thereby made more efficient and kept free of play in an efficient manner.

According to another aspect of the invention, the rack meshes directly with an input pinion having a large diameter relative to conventional rack and pinion assemblies and provides for a more efficient design and input pinion free of play.

DESCRIPTION OF EMBODIMENTS

Figure 1:
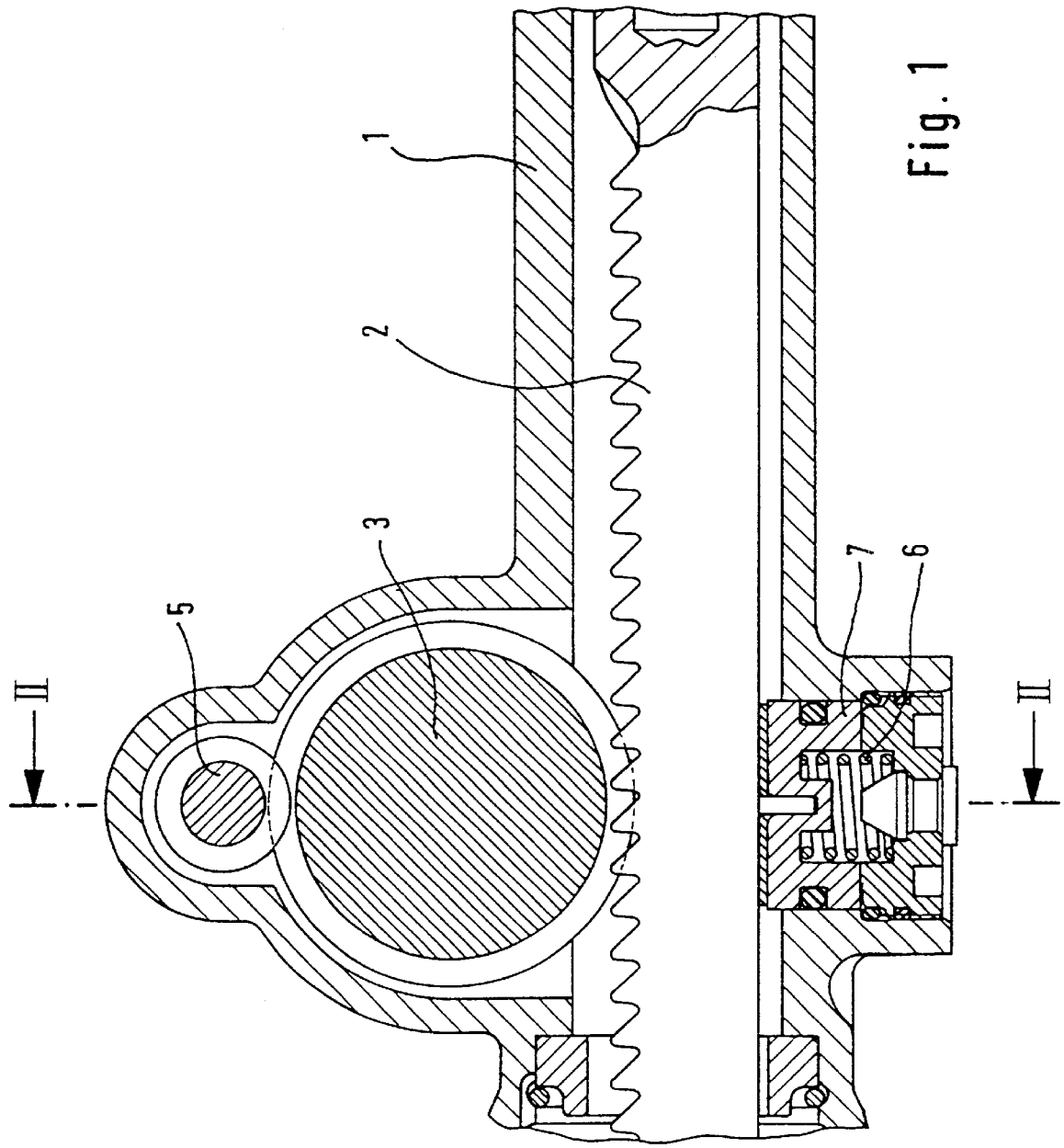
FIG. 1 illustrates a sectional diagram of an embodiment of a rack-and-pinion assembly.
Figure 2:
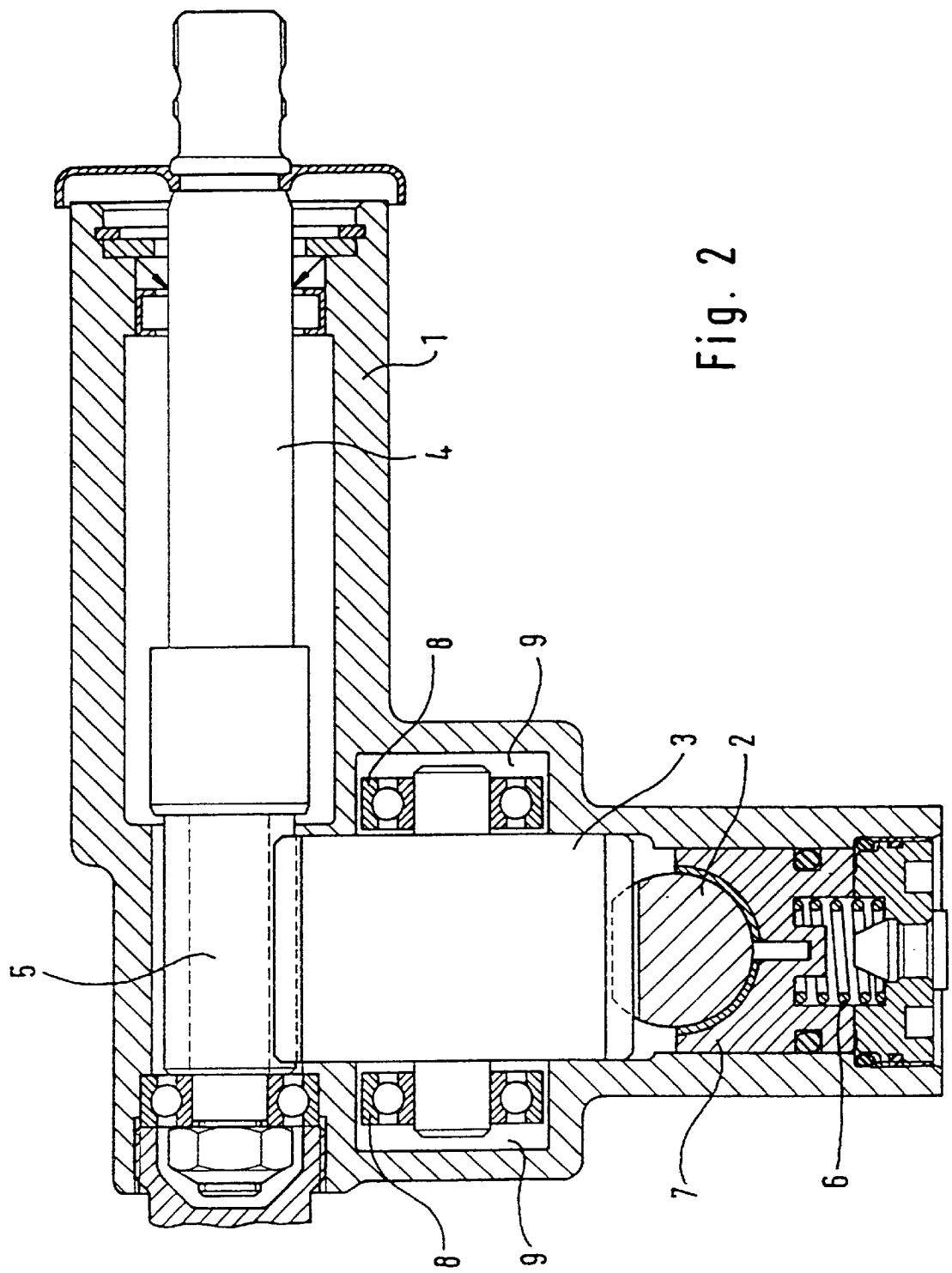
FIG. 2 illustrates a sectional diagram of an embodiment of a rack-and-pinion assembly along the sectional line II—II in FIG. 1.

FIGS. 1 and 2 illustrate an embodiment of a rack-and-pinion assembly. The rack 2 is mounted displaceable in a gear case 1. The rack 2 meshes with a pinion 3 which has a large diameter compared with a pinion in conventional rack-and-pinion steering assemblies, and in turn meshes, on its side located diametrically opposite the rack 2, with an input pinion 5 arranged fixedly in terms of rotation on an input shaft 4 or formed on the input shaft 4.

The rack 2 is urged against the pinion 3 by means of a thrust piece 7 loaded by a helical compression spring 6. The pinion 3 is rotationally mounted, within the gear case 1 in bearings 8 which are displaceable in the gear case 1 in a direction perpendicular to the axes of the rack 2 and input shaft 4. For this purpose, pockets 9 are arranged in the gear case 1 for receiving the bearings 8 and, as seen in FIG. 2 have an oval shape such that the bearings 8 are moveable in the above-mentioned direction of displacement, but are immovable in the direction perpendicular to the direction of displacement and to the axis of the pinion 3.

The input shaft 4 having the input pinion 5 is mounted in a radially fixed manner.

The pressure forces exerted on the rack 2 by the thrust piece 7 are accordingly transferred to the input pinion 5 via the pinion 3, so that, on the one hand, the toothing engagement between the rack 2 and pinion 3 and, on the other hand, the toothing engagement between the pinion 3 and input pinion 5 are kept free of play.

A distance of different size can be obtained between the axes of the rack 2 and of the input shaft 4, depending on the dimensioning of the diameter of the pinion 3.

It is also possible, in principle, to arrange a plurality of pinions corresponding to the pinion 3 between the input pinion 5 and the rack 2.

Figure 3A:
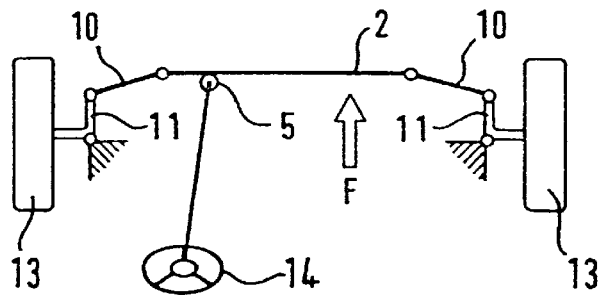
FIG. 3A illustrates a schematic of a top view of an embodiment of steering components.

FIG. 3A illustrates an embodiment of steering components including a rack-and-pinion steering assembly in which a rack 2 is connected at its ends in an articulated manner to track rods 10, the ends of which are connected in an articulated manner to steering levers 11 of vehicle wheels 13. In this case, the outer track-rod joints, that is to say the articulated connections between the track rods 10 and the steering levers 11, are arranged in front of the wheel center in the forward travel direction F, so that the vehicle wheels 13 are correspondingly steered to the left or to the right when the rack 2 is displaced to the left or to the right.

In the embodiment of FIG. 3A the rack 2 meshes directly with an input pinion 5 which in turn, is positively coupled to the steering wheel 14 via a steering column input shaft not illustrated. In order to ensure that rotation of the steering wheel 14 to the right or to the left leads to a steering of the vehicle wheels 13 to the right or to the left, input pinion 5 of this embodiment is arranged behind the rack 2 relative to the travel direction F. The rack 2 of this embodiment is urged directly against the input pinion 5 by a thrust piece loaded by a helical compression spring.

Figure 3B:
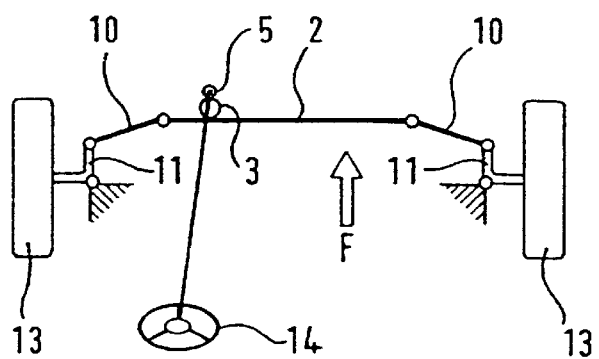
FIG. 3B illustrates a schematic of a top view of an embodiment of steering components.

FIG. 3B illustrates an embodiment of steering components including a rack-and-pinion assembly in which the input pinion 5 is arranged in front of the rack 2 relative to travel direction F and a pinion 3 is interposed between the input pinion 5 and the rack 2. The rack 2 of this embodiment is urged against the pinion 3, and pinion 3 against pinion 5 as shown in FIGS. 1 and 2.

Thus, as compared with the conditions in FIG. 3A, a marked shift of the input pinion 5 and, accordingly, of the associated input shaft or the steering column is achieved.

Figure 3C:
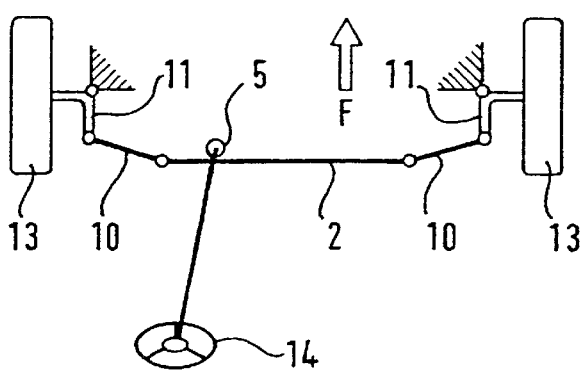
FIG. 3C illustrates a schematic of a top view of an embodiment of steering components.

FIG. 3C illustrates an embodiment of steering components including a rack-and-pinion assembly including a rack connected at its ends in an articulated manner to track rods 10. The track rods 10 of this embodiment are connected in an articulated manner to the steering levers 11 behind the wheel center of the vehicle wheels 13, relative to travel direction F, so that when the rack 2 is displaced to the right or to the left the vehicle wheels 13 are steered to the left or to the right correspondingly. The input pinion 5 meshing directly with the rack 2 is arranged in front of the rack relative to travel direction F, so that a rotation of the steering wheel 14 to the right or to the left results in a steering of the steered vehicle wheels 13 to the right or to the left correspondingly.

Figure 3D:
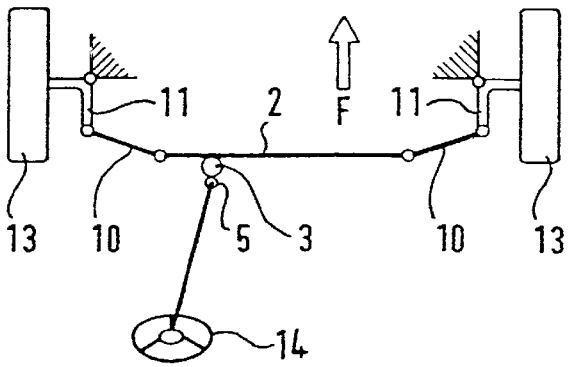
FIG. 3D illustrates a schematic of a top view of an embodiment of steering components.

FIG. 3D illustrates an embodiment of steering components including a rack-and-pinion steering assembly in which pinion 3 is interposed between the input pinion 5 and the rack 2, the two pinions 3 and 5 being arranged behind the rack 2, relative to direction F, so that the direction of rotation of the steering wheel 14 is once again translated to steer the vehicle wheels in the direction of the steering wheel.

As compared with the conditions in FIG. 3C, a marked shift of the input pinion 5 and consequently also the input shafts is achieved.

As a result, by virtue of the invention, the possibilities for arranging the input pinion 5 can be markedly extended.

In addition to the embodiments in FIGS. 3A and 3D, in which the track rods 10 adjoin the rack 2 without any transverse offset, there may also be provision for arranging the articulated connections between the rack 2 and track rods 10 on the rack 2 with an offset relative to the rack axis. The number of possibilities for variation is thereby increased even further.

Although the invention has been described in detail with reference to certain preferred embodiments and specific examples, variations and modification exist within the scope and spirit of the invention as described and as defined in the following claims.

What is claimed is:

1. A rack-and-pinion assembly comprising:
   a rack having a rack axis and adapted to couple to steerable vehicle wheels;
   a fixed gear ratio pinion having a circumferential portion meshing with the rack; and
   an input shaft coupled to the pinion with at least one gear element, the input shaft having an input shaft axis wherein the input shaft axis and the rack axis are a distance apart that is greater than the diameter of the pinion meshing with the rack.

2. The rack-and-pinion of claim 1, further comprising:
   an input pinion arranged on the input shaft, wherein the pinion includes a circumferential portion meshing with the input pinion directly opposite the circumferential portion meshing with the rack.

3. A rack-and-pinion assembly comprising:
   a rack having a rack axis;
   a pinion having a circumferential portion meshing with the rack;
   a second pinion, wherein the pinion includes a circumferential portion meshing with the second pinion directly opposite the circumferential portion meshing with the rack;
   an input pinion, wherein the second pinion includes a circumferential portion meshing with the input pinion directly opposite the circumferential portion meshing with the rack; and
   an input shaft coupled to the input pinion, the input shaft having an input shaft axis wherein the input shaft axis and the rack axis are a distance apart that is greater than the diameter of the pinion meshing with the rack.

4. The rack-and-pinion assembly of claim 3, wherein the rack is pressed resiliently against the pinion and the pinion and second pinion are moveable in the pressing directly such that the pressing force is transmitted to the input pinion on the input shaft, the input shaft being fixed radially.

5. A rack-and-pinion assembly comprising:
   a rack having a rack axis;
   a pinion having a circumferential portion meshing with the rack;
   an input shaft coupled to the pinion with at least one gear element, the input shaft having an input shaft axis wherein the input shaft axis and the rack axis are a distance apart that is greater than the diameter of the pinion meshing with the rack; and
   an input pinion arranged on the input shaft, wherein the pinion includes a circumferential portion meshing with the input pinion directly opposite the circumferential portion meshing with the rack;
   wherein the rack is pressed resiliently against the pinion and the pinion is moveable in the pressing direction such that the pressing force is transmitted to the input pinion on the input shaft, the input shaft being fixed radially.

* * * * *